(12) United States Patent
Kim et al.

(10) Patent No.: US 11,268,227 B2
(45) Date of Patent: Mar. 8, 2022

(54) WASHING MACHINE BASED ON ARTIFICIAL INTELLIGENCE AND METHOD OF CONTROLLING THE SAME

(71) Applicant: LG Electronics Inc., Seoul (KR)

(72) Inventors: Jinok Kim, Seoul (KR); Yunsik Park, Seoul (KR); Sungmok Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 60 days.

(21) Appl. No.: 16/556,115

(22) Filed: Aug. 29, 2019

(65) Prior Publication Data

US 2020/0071871 A1    Mar. 5, 2020

(30) Foreign Application Priority Data

Aug. 29, 2018   (KR) .................. 10-2018-0102313

(51) Int. Cl.
| | | |
|---|---|---|
| *D06F 33/38* | (2020.01) | |
| *D06F 34/05* | (2020.01) | |
| *D06F 34/22* | (2020.01) | |
| *D06F 39/06* | (2006.01) | |
| *D06F 103/00* | (2020.01) | |
| *D06F 103/04* | (2020.01) | |
| *D06F 103/20* | (2020.01) | |
| *D06F 103/22* | (2020.01) | |
| *D06F 105/52* | (2020.01) | |
| *D06F 105/58* | (2020.01) | |

(Continued)

(52) U.S. Cl.
CPC .............. *D06F 33/38* (2020.02); *D06F 34/05* (2020.02); *D06F 34/22* (2020.02); *D06F 39/06* (2013.01); *D06F 2101/20* (2020.02); *D06F 2103/00* (2020.02); *D06F 2103/04* (2020.02); *D06F 2103/20* (2020.02); *D06F 2103/22* (2020.02); *D06F 2105/52* (2020.02); *D06F 2105/58* (2020.02); *D06F 2105/60* (2020.02)

(58) Field of Classification Search
None
See application file for complete search history.

(56) References Cited

U.S. PATENT DOCUMENTS

2008/0155760 A1    7/2008   Hoppe

FOREIGN PATENT DOCUMENTS

| DE | 102010038969 | | 2/2011 | |
| DE | 102010038969 A1 | * | 2/2011 | .............. D06F 39/06 |
| EP | 0544945 A1 | * | 6/1993 | ............... H04N 7/18 |

(Continued)

OTHER PUBLICATIONS

See English Machine Translation DE-102010038969-A1.*
Extended European Search Report in European Application No. 19194030.3, dated Dec. 13, 2019, 7 pages.

*Primary Examiner* — Mikhail Kornakov
*Assistant Examiner* — Pradhuman Parihar
(74) *Attorney, Agent, or Firm* — Fish & Richardson P.C.

(57) ABSTRACT

Disclosed herein is a washing machine including a door including an external cover and an internal glass to open and close a laundry entrance, at least one image sensor disposed to face the internal glass to acquire image data, a detergent bubble recognizer configured to recognize detergent bubble from the image data through a machine learning based image recognition model, and a controller configured to perform control to perform an additional rinsing cycle based on a result of recognition.

13 Claims, 8 Drawing Sheets

(51) Int. Cl.
   *D06F 105/60* (2020.01)
   *D06F 101/20* (2020.01)

(56) References Cited

FOREIGN PATENT DOCUMENTS

| | | |
|---|---:|---:|
| IE | 922889 | 6/1993 |
| JP | 2635836 | 7/1997 |
| JP | H10174798 | 6/1998 |
| JP | 2003154191 | 5/2003 |
| JP | 2013043048 | 3/2013 |
| JP | 2013090736 | 5/2013 |
| JP | 2016083106 | 5/2016 |
| JP | 6347094 | 6/2018 |
| KR | 1019950018824 | 7/1995 |
| KR | 1019950018829 | 7/1995 |
| KR | 1019950011601 | 10/1995 |
| KR | 100297050 | 5/2001 |
| KR | 20080002504 | 1/2008 |
| KR | 1020140019553 | 2/2014 |
| KR | 101841248 | 3/2018 |
| TW | 201111580 | 4/2011 |

\* cited by examiner

WASHING MACHINE BASED ON ARTIFICIAL INTELLIGENCE AND METHOD OF CONTROLLING THE SAME

CROSS-REFERENCE TO RELATED APPLICATIONS

This application claims priority to Korean Patent Application No. 10-2018-0102313 filed on Aug. 29, 2018, in Korea, the entire contents of which are hereby incorporated by reference in their entirety.

BACKGROUND OF THE INVENTION

1. Field of the Invention

The present invention relates to a washing machine, and, more particularly, to a washing machine for detecting residual detergent based on artificial intelligence and performing an additional rinsing operation, and a method of controlling the same.

2. Discussion of the Related Art

In general, a washing machine is an apparatus for treating laundry through several cycles such as washing, rinsing, dehydration and/or drying.

A washing machine may perform a washing operation including a washing cycle, a rinsing cycle and a dehydration cycle as a process of removing contaminants of laundry.

The washing cycle refers to a cycle for removing contaminants of laundry using detergent and wash water, the rinsing cycle refers to a cycle for removing detergent and contaminants from laundry using wash water, and the dehydration cycle refers to a cycle for removing water from the laundry.

The rinsing cycle refers to a cycle for discharging detergent and contaminants from a tub or a drum to the outside. After the rinsing cycle is completed, it is preferable that residual detergent is not present in the tub or the drum. However, in a conventional washing machine, detergent may remain in the laundry or the drum (the internal glass of a door) even after the rinsing cycle is completed. When the washing operation is completed and the laundry is dried in a state in which the detergent remains, the laundry may deteriorate or the skin of a user may be damaged.

However, it is difficult for the user to directly check whether residual detergent is present even after the rinsing cycle is completed and it is troublesome to check residual detergent and operate the washing machine to further perform the rinsing cycle.

Patent Document 1 (Korean Patent Laid-Open publication No. 10-1995-0018824) discloses a configuration for calculating the amount of bubble and a bubble removal rate through a turbidity detection voltage of an optical sensor and determining a bubble removal degree to determine the number of times of rinsing. However, in the conventional document, since the amount of bubble and the bubble removal rate are continuously calculated from the washing cycle to the rinsing cycle in order to determine the bubble removal degree, the turbidity detection voltage is continuously measured while the washing cycle and the rising cycle are performed, thereby lowering efficiency.

Meanwhile, recently, interest in artificial intelligence technology is increasing. Technology for realizing human learning ability on a computer among various fields of the artificial intelligence technology Machine learning includes machine learning.

Conventional machine learning was centered on classification, regression and clustering models based on statistics. In particular, in supervised learning of the classification and regression models, characteristics of learning data and a learning model for distinguishing new data based on such characteristics are predefined. Recently, deep learning, interest in which increases along with emergence of the big data concept, means that a computer autonomously finds and identifies characteristics thereof using vast amounts of data.

Recently, deep learning frameworks provided as an open source in association with such deep learning have appeared and, for efficient learning and recognition, a learning process, a learning method and technology related to extraction and selection of data used for learning have further become important in addition to a deep learning algorithm. In addition, research into use of machine learning in various products or services has increased.

SUMMARY OF THE INVENTION

An object of the present invention is to provide a washing machine based on artificial intelligence, which is capable of accurately recognizing presence of residual detergent after a rinsing cycle is completed.

Another object of the present invention is to provide a washing machine which is capable of performing an efficient additional rinsing cycle depending on whether residual detergent is present.

A washing machine according to an embodiment of the present invention acquires image data from at least one image sensor disposed to face an internal glass of a door and more accurately recognize detergent bubble present on the internal glass from the image data through an image recognition model based on machine learning, thereby more efficiently performing a rinsing cycle.

The washing machine may process the image data and calculate a ratio of the area of the detergent bubble to the area of the internal glass, when detergent bubble is recognized from the image data, thereby efficiently setting the number of times of performing an additional rinsing cycle or a time when the additional rinsing cycle is performed.

The washing machine may update the image recognition model using the acquired image data and at least one of information on the amount of laundry, information on the amount of detergent, or washing mode information, thereby providing an accurate image recognition model through learning optimized for a use pattern.

At least one image sensor included in the washing machine is disposed between the external cover and the internal glass of the door, thereby efficiently preventing damage or failure due to external or internal impact or contact.

In some embodiments, the washing machine further includes at least one light source provided on an inner circumferential surface of a laundry entrance. The light source is turned on when the image data is acquired, thereby more efficiently showing detergent bubble present on the internal glass.

In some embodiments, the image recognition model may include a deep neural network established based on deep learning.

In some embodiments, the washing machine may update the image recognition model using learning data acquired from a learning server, thereby providing an accurate image recognition model through learning data based on a vast amount of data acquired by a learning server.

DETAILED DESCRIPTION OF THE PREFERRED EMBODIMENTS

Exemplary embodiments of the present invention will be described below in detail with reference to the accompanying drawings. The accompanying drawings are used to help easily understood the technical idea of the present invention and it should be understood that the idea of the present invention is not limited by the accompanying drawings. The idea of the present invention should be construed to extend to any alterations, equivalents and substitutions besides the accompanying drawings.

Figure 1:
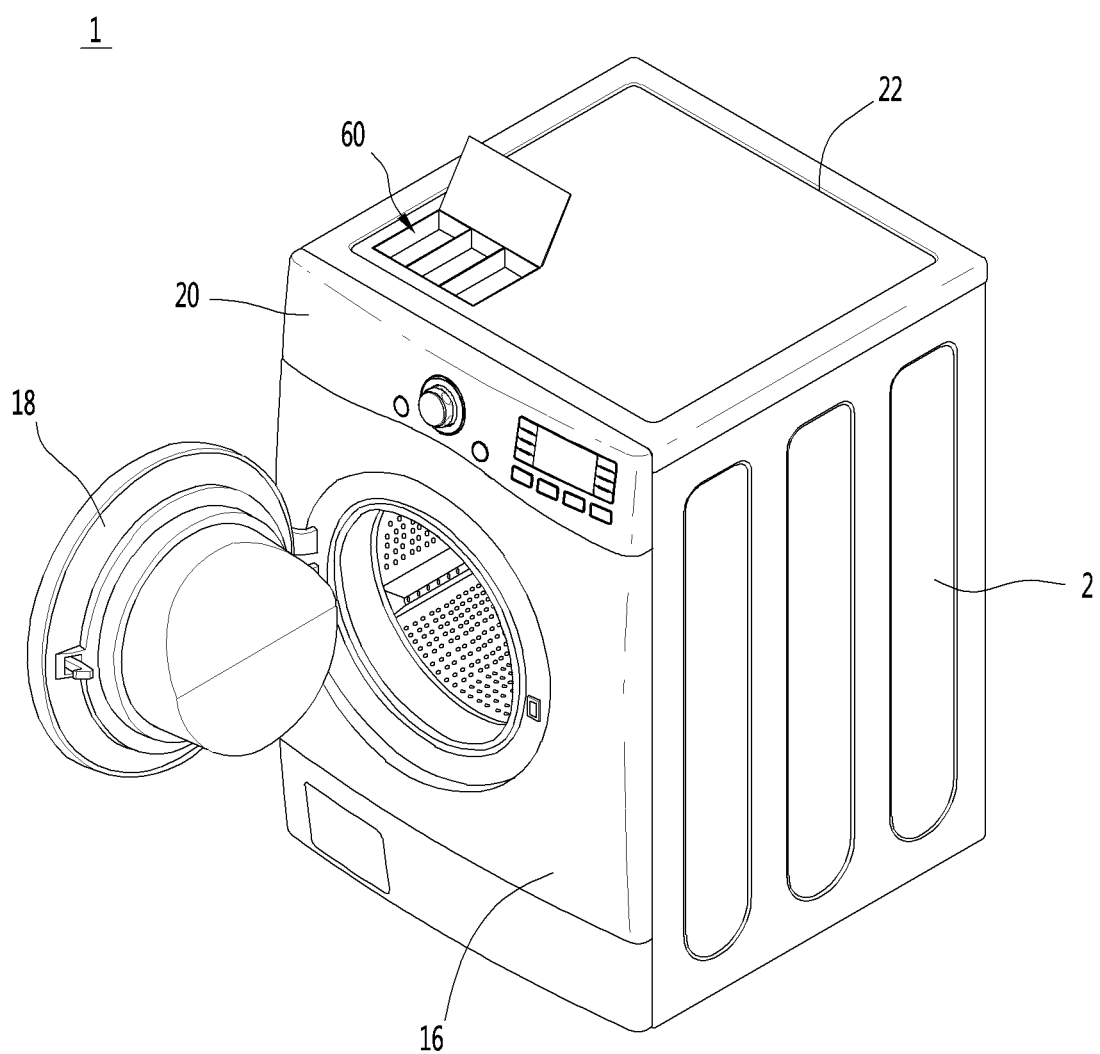
FIG. 1 is a perspective view showing a washing machine according to an embodiment of the present invention.
Figure 2:
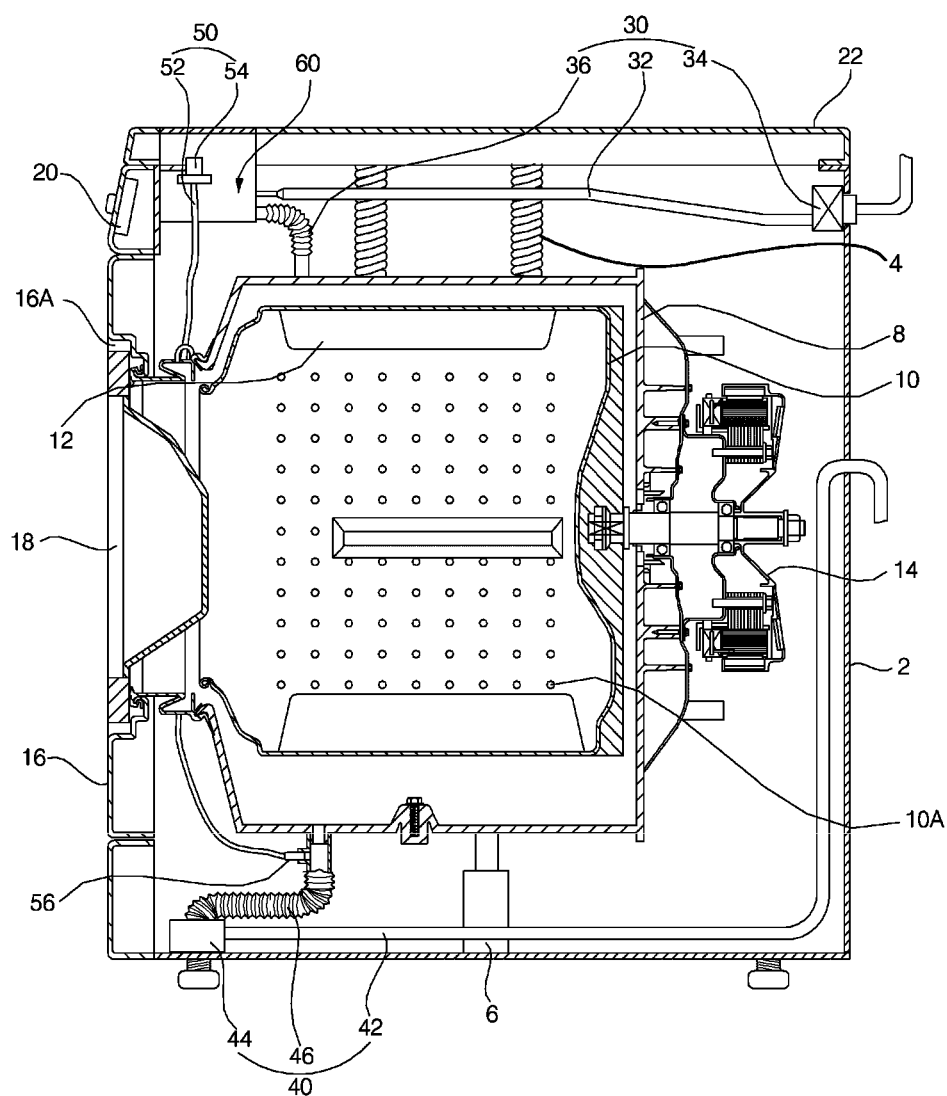
FIG. 2 is a longitudinal cross-sectional view showing the internal configuration of the washing machine according to the embodiment of the present invention.

FIG. 1 is a perspective view showing a washing machine according to an embodiment of the present invention, and FIG. 2 is a longitudinal cross-sectional view showing the internal configuration of the washing machine according to the embodiment of the present invention.

Hereinafter, for example, a washing machine as a laundry treatment apparatus will be described.

Referring to FIGS. 1 and 2, a washing machine 1 for performing a control method according to an embodiment of the present invention may include a cabinet 2 forming appearance thereof, a tub 8 disposed inside the cabinet 2, a drum 10 disposed inside the tub 8, a lifter 12 mounted on an inner circumferential surface of the drum 10, a driving unit (motor) 14 for rotating the drum 10, a cabinet cover 16 mounted on a front surface of the cabinet 2, a door 18 coupled to the cabinet cover 16, and a control panel 20 for inputting an operation command of the washing machine.

Specifically, the tub 8 is installed inside the cabinet 2 so as to be damped by a spring 4 and a damper 6 and has wash water received therein. In addition, the drum 10 is rotatably disposed inside the tub 8 and has a plurality of through-holes 10A, through which wash water passes. In addition, laundry is accommodated in the drum 10.

In addition, the lifter 12 is installed on an inner surface of the drum 10 to lift laundry up to a certain height such that laundry falls by the gravity when the drum 10 rotates. The driving unit is installed behind the tub 8 to rotate the drum 10.

In addition, the cabinet cover 16 is installed at the front side of the cabinet 2 and has a laundry entrance 16A formed at the center thereof. In addition, the door 18 is rotatably installed on the cabinet cover 16 to open and close the laundry entrance 16A. In addition, the control panel 20 is disposed at the upper side of the cabinet cover 16 to display the operation state of the washing machine and includes an input key for an operation command of the washing machine.

Here, a top plate 22 is installed on an upper surface of the cabinet 2, and a water supply part 30 including a water supply hose 32, a water supply valve 34 and a water supply bellows 36 is provided below the top plate 22. In addition, wash water is supplied from the outside of the washing machine into the tub 8 through the water supply part 30.

A detergent supply part 60 is interposed between the water supply hose h32 and the water supply bellows 36 such that detergent is supplied into the tub 8 along with water supplied by the water supply part 30. In addition, a drainage part 40 including a drainage hose 42, a drainage pump 44 and a drainage bellows 46 is installed below the tub 8, in order to discharge wash water used for washing and rinsing to the outside.

In some embodiments, the washing machine 1 may include a water level detector 50 for detecting the level of wash water supplied into the tub 8. The water level detector 50 includes an air hose 52 having one end connected to the lower part of the tub 8 and filled with air and a water level sensor 54 connected to the other end of the air hose 52 to measure the level of water in the tub 8 with a frequency change amount according to pressure change of air transmitted through the air hose 52.

One end of the air hose 52 may be directly connected to the lower portion of the tub 8 or may be connected to an air chamber 56 formed in any one of the drainage bellows 46 and the lower portion of the tub 8.

Specifically, the air chamber 56 is a tubular structure filled with air, one side thereof is inserted into the drainage bellows 46 to allow wash water to flow in and out, and the other side thereof is connected to the air hose 52.

In addition, the water level sensor 54 measures the level of wash water in the tub 8 from change in air pressure transmitted by the air hose 52. That is, when the level of wash water supplied into the tub 8, air pressure acting on the air hose 52 is changed as wash water flows in and out of the air chamber 56. The air hose 52 transmits water pressure to the water level sensor 54 via air, and the water level sensor 54 detects the level of wash water received in the tub 8 based on a frequency change amount varying according to pressure change.

When a user puts contaminated laundry into the drum 10, the washing machine 1 may perform washing operation by an appropriate mixture of detergent and wash water. For example, the washing operation may include a washing cycle, a rinsing cycle and a dehydration cycle. The washing cycle refers to a cycle for removing contaminants from laundry using detergent and wash water, the rising cycle refers to a cycle for removing detergent and contaminants from laundry using wash water, and the dehydration cycle refers to a cycle for removing water from laundry.

The rinsing cycle refers to a cycle for discharging detergent and contaminants from the drum 10 to the outside. After the rinsing cycle is completed, it is preferable that residual detergent is not present in the drum 10. However, in the conventional washing machine, even after the rinsing cycle is completed, detergent may remain in the laundry or inside the drum 10 (the internal glass of the door 18, etc.). When the washing operation is completed and laundry is dried in a state in which the detergent remains, the laundry may deteriorate or the skin of the user may be damaged.

However, it is difficult for the user to directly check whether residual detergent remains after the rinsing cycle is completed and it is troublesome to check residual detergent and operate the washing machine to perform an additional rinsing cycle.

The washing machine 1 according to the embodiment of the present invention may autonomously check whether residual detergent is present after the rinsing cycle is completed and perform an additional rinsing cycle, thereby solving user troublesomeness and improving satisfaction with products. Hereinafter, the washing machine 1 according to the embodiment of the present invention will be described in detail with reference to FIGS. 3 to 14.

Figure 3:
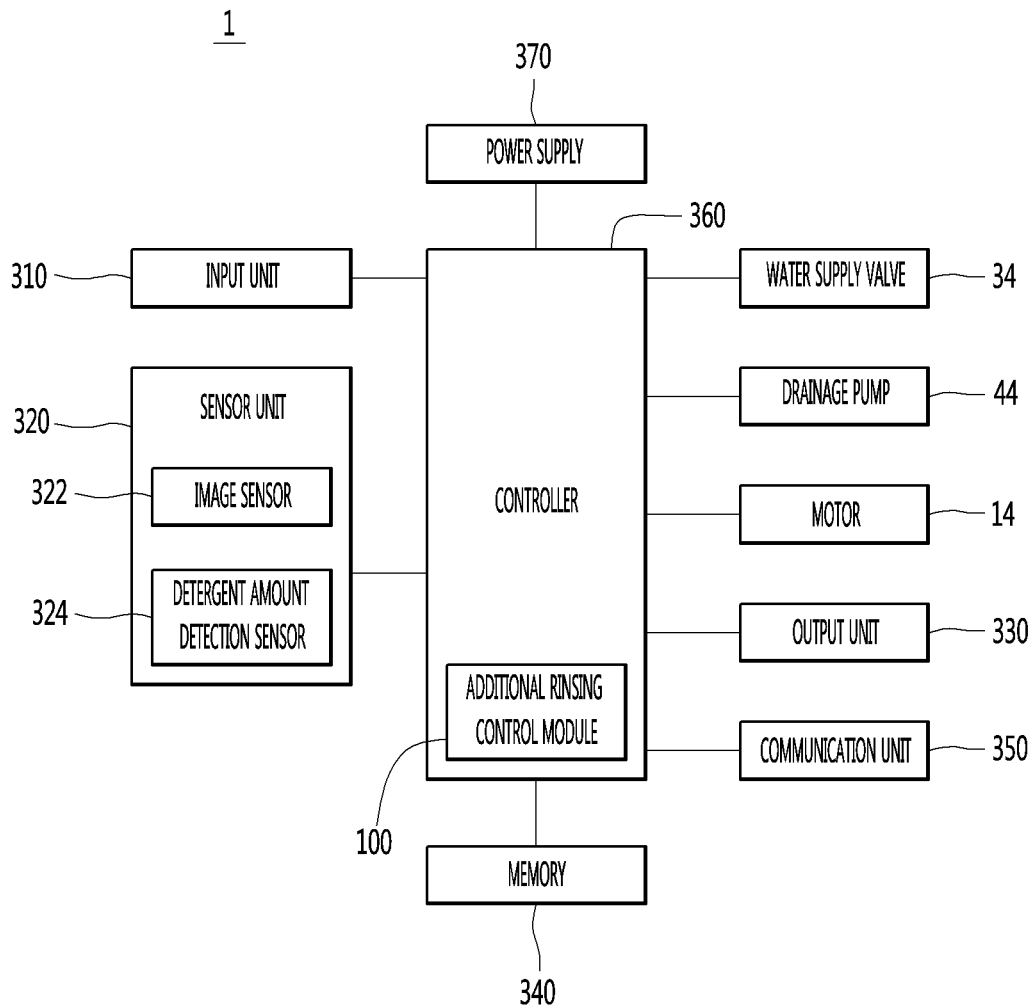
FIG. 3 is a view showing the control configuration of the washing machine according to the embodiment of the present invention.

FIG. 3 is a view showing the control configuration of the washing machine according to the embodiment of the present invention.

Referring to FIG. 3, the washing machine 1 may include an input unit 310, a sensor unit 320, an output unit 330, a memory 340, a communication unit 350, a controller 360 and a power supply 370. The components shown in FIG. 3 are not essential for implementing the washing machine 1 and thus the washing machine 1 may include more or fewer components.

The input unit 310 may include at least one input portion for inputting predetermined signals or data to the washing machine 1 by operation of the user. For example, the at least one input portion may include a button, a dial, a touch pad, a microphone, etc. The input unit 310 may be disposed on the control panel 20 of FIG. 1, without being limited thereto.

The sensor unit 320 may include at least one sensor for sensing a variety of data during the washing operation of the washing machine 1.

For example, the sensor unit 320 according to the embodiment of the present invention may include an image sensor 322 and a detergent amount detection sensor 324. In some embodiments, the sensor unit 320 may include more sensors.

The image sensor 322 may detect the image of a subject based on light reflected from the subject and generate image data corresponding to the result of detection. The image sensor 322 may be included in at least one camera installed inside or outside the washing machine 1. The at least one camera may be implemented by a general camera for generating the image data using one image sensor 322 or a stereo camera for generating image data including distance information of the subject using a plurality of image sensors 322.

According to the embodiment of the present invention, the image sensor 322 may be disposed to face the internal glass 182 (see FIG. 8) of the door 18, thereby acquiring image data including the internal glass 182. This will be described in greater detail below with reference to FIGS. 7 to 10.

The detergent amount detection sensor 324 may detect the amount of detergent put into a detergent supply part 60 or the drum 10 during the washing operation. For example, the detergent amount detection sensor 324 may be configured to detect weight change of the detergent supply part 60 to detect the amount of detergent or measure the concentration of the detergent in wash water to detect the amount of detergent after detergent is put into the drum 10, without being limited thereto.

Meanwhile, if the detergent amount detection sensor 324 is configured to detect the weight change of the detergent supply part 60, the controller 360 may provide the user with information on an appropriate amount of detergent during the washing operation through the output unit 330 based on data accumulated according to the below-described learning operation. Alternatively, when the detergent supply part 60 has a function for automatically putting detergent, the controller 360 may control the detergent supply part 60 such that the detergent is put into the drum 10 according the appropriate amount of detergent.

The output unit 330 may include an output portion for notifying the user of a variety of information related to operation of the washing machine 1. For example, the output unit 330 may include a speaker or a buzzer as an audio output unit, and include a display as a graphic or text output unit. For example, the output unit 330 may be disposed on the control panel 20 of FIG. 1, without being limited thereto.

In the memory 340, a variety of data such as control data for operation control of the washing machine 1, input washing setting data, data on a washing time or a washing course calculated according to washing settings, and data for determining whether an error occurs in the washing machine 1 may be stored.

In addition, in the memory 340, data detected or measured through the sensor unit 320 during operation of the washing machine 1 and data transmitted and received through the communication unit 350 may be stored.

The communication unit 350 may include at least one communication module for connecting the washing machine 1 to a server or a user terminal. For example, the communication unit 350 may include a short-range communication module such as Bluetooth or near field communication (NFC), a wireless Internet module such as Wi-Fi, or a mobile communication module. The controller 360 may transmit the state information or operation information of the washing machine 1 to the server or the terminal through the communication unit 350.

The controller 360 may control overall operation of the washing machine 1. The controller 360 may control the washing operation including the washing cycle, the rinsing cycle, the dehydration cycle and the dry cycle. The controller 360 may perform the washing operation according to a predetermined algorithm and control driving of a motor 14, a water supply valve 34 and a drainage pump 44 according to the cycle.

The controller 360 may perform laundry amount detection operation for detecting the amount of laundry received in the drum 10 during the washing operation. There are various methods of detecting the amount of laundry at the controller 360. For example, when a washing mode is set by the user and a command for starting the washing operation is received, the controller 360 may control the motor 14 and rotate the drum 10 at a certain rotation speed during a certain time. Thereafter, the controller 360 may measure a deceleration time of the drum 10 to detect the amount of laundry. For example, as the deceleration time of the drum 10 increases, the amount of laundry may increase.

In addition, as described above, the controller 360 may control the detergent amount detection sensor 324 to detect the amount of detergent during the washing operation.

The controller 360 may include at least one processor or controller for controlling the operation of the washing machine 1. In detail, the controller 360 may include at least one CPU, an application processor (AP), a microcomputer (or a micom), an integrated circuit, an application-specific integrated circuit (ASIC), and the like.

The power supply 370 may receive external power and supply power to the components included in the washing machine 1, under control of the controller 360.

Meanwhile, the controller 360 according to the embodiment of the present invention may control the image sensor 322 to acquire image data, after the rinsing cycle is completed. The controller 360 may recognize whether residual detergent is present using the acquired image data as input data of an artificial neural network (ANN) learned through machine learning.

The controller 360 may include an additional rinsing control module 100 for recognizing whether residual detergent is present after the rinsing cycle is completed based on the data learned through machine learning, and perform control to perform an additional rinsing cycle according to the result of recognition.

Although the additional rinsing control module 100 is shown as being included in the controller 360 in FIG. 3, the additional rinsing control module 100 may be implemented as a chip or module separately from the controller 360 in some embodiments. In this case, the additional rinsing control module 100 may transmit and receive data to and from the controller 360 through an internal interface.

Hereinafter, the additional rinsing control module 100 will be described in greater detail with reference to FIG. 4.

Figure 4:
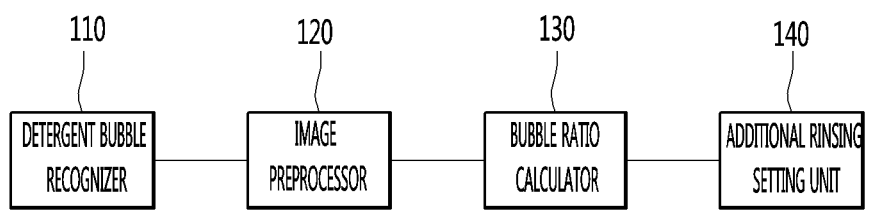
FIG. 4 is a diagram showing an embodiment of the detailed configuration of an additional rinsing control module shown in FIG. 3.

FIG. 4 is a diagram showing an embodiment of the detailed configuration of an additional rinsing control module shown in FIG. 3.

Referring to FIG. 4, the additional rinsing control module 100 may include a detergent bubble recognizer 110 for recognizing presence of detergent bubble from image data.

Specifically, the detergent bubble recognizer 110 may recognize presence of detergent bubble from the image data acquired by the image sensor 322 using an image recognition model based on machine learning as a field of artificial intelligence. For example, the image recognition model may include a software or hardware artificial neural network (ANN). For example, the artificial neural network may include a convolutional neural network (CNN) learned through deep learning, a recurrent neural network (RNN), and a deep neural network (DNN) such as a deep belief network (DBN).

When the image data is input, the detergent bubble recognizer 110 may find a certain pattern from the input image data to form a feature map. For example, the detergent bubble recognizer 110 may extract a low-level feature, a middle-level feature and a high-level feature of the image data and recognize presence of detergent bubble. The pattern and the features may be learned from a plurality of previously input image data.

In some embodiments, the detergent bubble recognizer 110 may form the feature map after a preprocessing procedure such as size adjustment of the input image data.

Hereinafter, as an example of artificial intelligence technology applied to the detergent bubble recognizer 110 of the additional rinsing control module 100, deep learning will be described in greater detail with reference to FIGS. 5 and 6.

Figure 5:
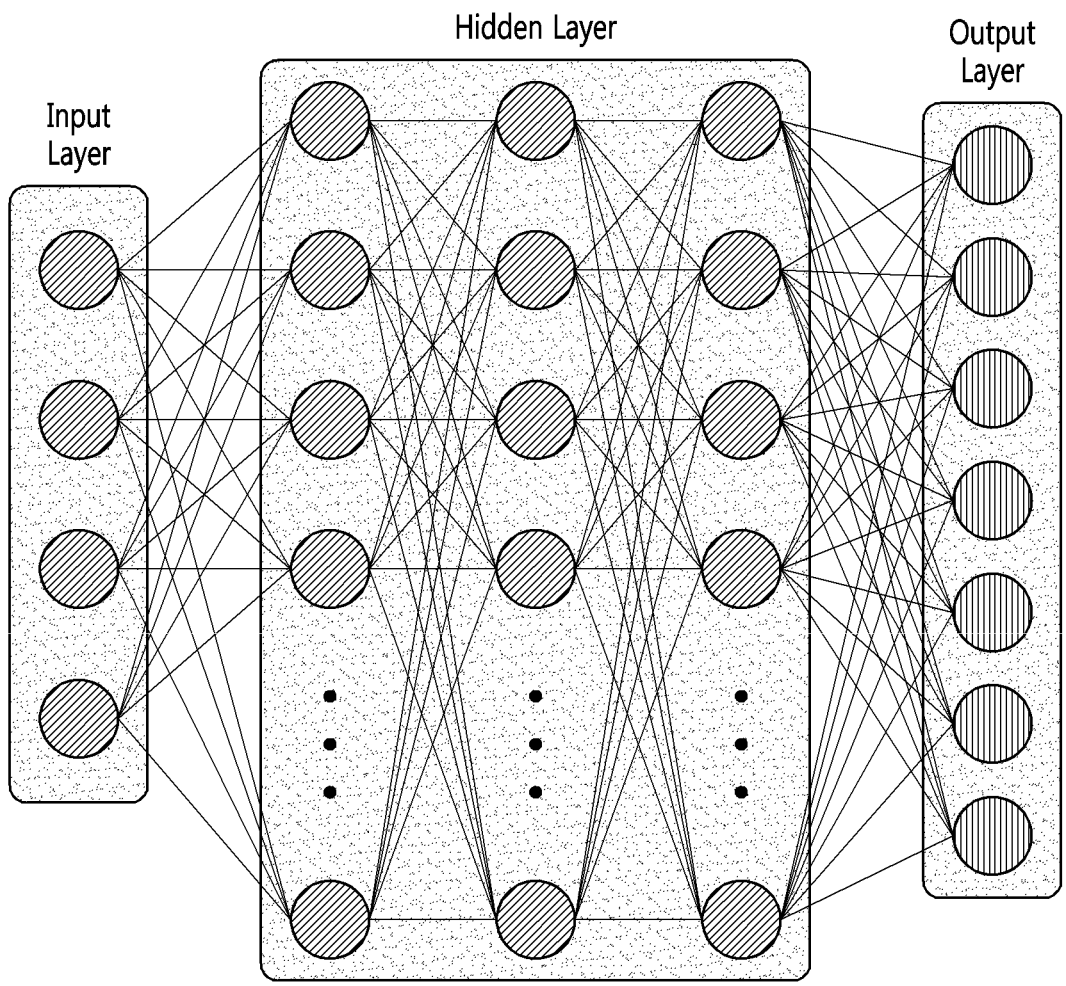
FIGS. 5 and 6 are diagrams illustrating deep learning as an example of artificial intelligence applied to a detergent bubble recognizer of FIG. 4.
Figure 6:
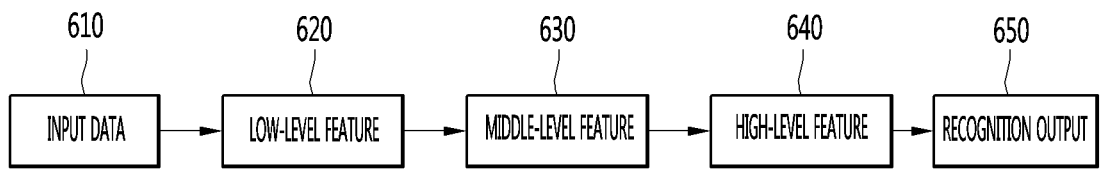

FIGS. 5 and 6 are diagrams illustrating deep learning as an example of artificial intelligence applied to a detergent bubble recognizer of FIG. 4.

Artificial intelligence (AI) is a field of computer engineering and information technology involving studying how computers can think, learn and self-develop in ways similar to human intelligence. Machine learning as a field of artificial intelligence may mean a system for performing prediction based on empirical data and improving performance thereof through learning. Deep learning technology as a kind of machine learning learns data up to a deep level in multiple steps.

Deep learning may represent a set of machine learning algorithms for extracting core data from a plurality of data as the step increases.

The deep learning structure may include an artificial neural network (ANN). For example, the deep learning structure may include a convolutional neural network (CNN), a recurrent neural network (RNN), and a deep neural network (DNN) such as a deep belief network (DBN).

Referring to FIG. 5, the artificial neural network may include an input layer, a hidden layer and an output layer. Each layer includes a plurality of nodes and each layer is connected to a next layer. Nodes between adjacent layers may be connected to each other with a weight.

Referring to FIG. 6, a computing device (machine) may find a certain pattern from input data 610 to form a feature map. For example, the computing device (machine) may extract a middle-level feature 630 and a high-level feature 640 from a low-level feature 620, recognize an object, and output a result (650).

The artificial neural network may be abstracted into higher-level features toward the following layer.

Referring to FIGS. 5 and 6, each node may operate based on an activation model and an output value corresponding to an input value may be determined according to the activation model.

The output value of any node, for example, a low-level feature 620, is input to a node of a next layer connected to the corresponding node, for example, the middle-level feature 630. A node of a next layer, for example, a node of the middle-level feature 630, may receive values output from a plurality of nodes of the low-level feature 620.

At this time, the input value of each node may be a value obtained by applying a weight to the output value of the node of a previous layer. The weight may mean a connection strength between nodes.

In addition, a deep learning process may be regarded as a process of finding an appropriate weight.

Meanwhile, the output value of any node, for example, the middle-level feature 630, is input to a node of a next layer connected to the corresponding node, for example, the high-level feature 640. A node of a next layer, for example, a node of the high-level feature 640, may receive values output from a plurality of nodes of the middle-level feature 630.

The artificial neural network may extract feature information corresponding to each level using a learned layer corresponding to each level. The artificial neural network may be sequentially abstracted to recognize a predetermined object using feature information of a highest level.

For example, in a face recognition process using deep learning, a computer may distinguish between bright pixels and dark pixels according to the brightness of the pixel, identify simple shapes such as borders, edges, etc., identify more complicated shapes and objects. Finally, the computer may grasp a shape defining a human face.

The deep learning structure according to the present invention may use various known structures. For example, the deep learning structure according to the present invention may be a convolutional neural network (CNN), a recurrent neural network (RNN), a deep belief network (DBN), etc.

The recurrent neural network (RNN) is widely used for natural language processing, and may configure an artificial neural network structure by stacking layers at each moment as a structure efficient for time-series data processing which varies with time.

The deep belief network (DBN) is a deep learning structure configured by stacking multiple layers of a restricted Boltzman Machine as a deep learning scheme. When a certain number of layers is formed by repeating restricted Boltzman Machine learning, a deep belief network (DBN) having the certain number of layers may be configured.

The convolutional neural network (CNN) is a model which simulates a person's brain function based on the assumption that, when a person recognizes an object, the basic features of the object are extracted, complicated calculation is performed in the brain, and the object is recognized based on the result.

Meanwhile, learning of the artificial neural network may be done by adjusting the weight of a connection line between nodes (adjusting a bias value if necessary) such that desired output is obtained from given input. In addition, the artificial neural network may continuously update a weight value by learning. In addition, a back propagation method, etc. may be used for learning of the artificial neural network.

Meanwhile, input data for recognizing detergent bubble and data for learning of the artificial neural network may be stored in the memory 340. The input data may be acquired from the image sensor 322.

In addition, in some embodiments, weights and biases forming the artificial neural network structure may be stored in the memory 340. In some embodiments, weights and biases forming the artificial neural network structure may be stored in an embedded memory of the additional rinsing control module 100.

Meanwhile, the additional rinsing control module 100 may perform the learning process of the detergent bubble recognizer 110 using the acquired image data, whenever image data is acquired from the image sensor 322 after the rinsing cycle is completed.

That is, the additional rinsing control module 100 may update the artificial neural network structure such as weight, by adding a result of recognition, whenever presence of detergent bubble is recognized using image data.

Alternatively, the washing machine 1 may transmit the acquired image data to a server through the communication unit 350 and receive data related to machine learning from the server. In this case, the server may include a learning module and perform a learning process using detected data received from the washing machine 1. In this case, the washing machine 1 may update the detergent bubble recognizer 110 of the additional rinsing control module 100 based on the data related to machine learning received from the server.

The learning process will be described in greater detail with reference to FIGS. 12 to 14.

Referring to FIG. 4 again, the additional rinsing control module 100 may include an image preprocessor 120 for extracting a region in which detergent bubble is present from the image data when presence of detergent bubble in the image data is recognized by the detergent bubble recognizer 110.

The image data acquired by the image sensor 322 may include another object such as laundry in the drum 10 in addition to detergent bubble. The image preprocessor 120 may preprocess image data in order to extract a detergent bubble region of the image data. The image preprocessor 120 may preprocess the image data only when presence of detergent bubble in the image data is recognized by the detergent bubble recognizer 110, thereby preventing unnecessary image preprocessing operation.

For example, the image preprocessing process may adjust the contrast of image data, compare detergent bubble with other objects, and extract a detergent bubble region from the image data through a background subtraction algorithm. Various known algorithms may be applied as the background subtraction algorithm.

For example, the image preprocessor 120 may acquire a plurality of image data from the image sensor 322 before or while the rinsing cycle is performed, and distinguish between a background region and a detergent bubble region through comparison between the plurality of acquired image data and image data acquired after the rinsing cycle is completed, thereby removing the background region.

Alternatively, the image preprocessor 120 may distinguish between a background region and a detergent bubble region using the feature points of detergent bubble extracted from the background region by the detergent bubble recognizer 110, thereby removing the background region.

Alternatively, when the image sensor 322 is implemented in the form of a stereo camera, distance information may be included in the image data. The image preprocessor 120 may distinguish between a background region and a detergent bubble region in the image data based on the distance information, thereby removing the background region.

Subtraction of the background region may mean that a pixel value corresponding to the background region of the image data is adjusted (for example, into a black color) to clearly distinguish between the detergent bubble region and the background region.

The additional rinsing control module 100 may include a bubble ratio calculator 130 for calculating the ratio of detergent bubble based on the detergent bubble region extracted from the image data. For example, the ratio of detergent bubble may correspond to the ratio of the area of the detergent bubble region to the area of the internal glass 182 of the door 18. Information on the area of the internal glass 182 may be prestored in the memory 340 or a separate memory included in the additional rinsing control module 100.

Alternatively, the ratio of the detergent bubble may be calculated based on the ratio of the number of pixels of the detergent bubble region to the number of pixels of the image data. To this end, the bubble ratio calculator 130 may calculate the number of pixels corresponding to the detergent bubble region of the image data to calculate the ratio of detergent bubble.

The additional rinsing control module 100 may include an additional rinsing setting unit 140 for setting an additional rinsing cycle based on the ratio of detergent bubble calculated by the bubble ratio calculator 130.

The additional rinsing setting unit 140 may set the number of times of performing the additional rinsing cycle and/or a time when the additional rinsing cycle is performed based on the calculated ratio of detergent bubble. The additional rinsing setting unit 140 may compare the calculated ratio of detergent bubble with at least one predetermined reference ratio to set the number of times of performing the additional rinsing cycle and/or the time when the additional rinsing cycle is performed.

For example, the additional rinsing setting unit 140 may set the number of times of performing the additional rinsing cycle to a first number (e.g., three) when the calculated ratio of detergent bubble is equal to or greater than a first ratio (e.g., 50%). The additional rinsing setting unit 140 may set the number of times of performing the additional rinsing cycle to a second number (e.g., two) when the calculated ratio of detergent bubble is equal to or greater than a second ratio (e.g., 30%) and is less than the first ratio (e.g., 50%). The additional rinsing setting unit 140 may set the number of times of performing the additional rinsing cycle to a third number (e.g., 1) when the calculated ratio of detergent bubble is less than the second ratio (e.g., 30%).

Meanwhile, in some embodiments, the additional rinsing setting unit 140 may not be included in the additional rinsing control module 100 and the controller 360 may perform the function of the additional rinsing setting unit.

That is, the washing machine 1 according to the embodiment of the present invention may recognize presence of residual detergent (detergent bubble) from image data using an image recognition model based on artificial intelligence and perform control to perform the additional rinsing cycle based on the result of recognition, thereby more efficiently performing the rinsing cycle of the washing operation.

Figure 7:
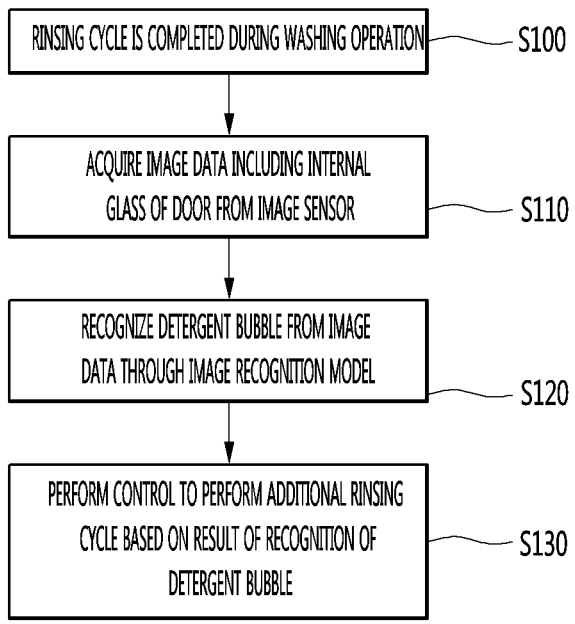
FIG. 7 is a flowchart illustrating control operation of the washing machine according to the present invention.

FIG. 7 is a flowchart illustrating control operation of the washing machine according to the present invention.

Referring to FIG. 7, when the rinsing cycle of the washing operation is completed (S100), the washing machine 1 may acquire image data including the internal glass of the door 18 from the image sensor 322 (S110).

When a user inputs a setting and start request of the washing mode (washing course) through the input unit 310, the controller 360 of the washing machine 1 may control the components included in the washing machine 1 to perform the washing operation.

When the rinsing cycle of the washing operation is completed, the controller 360 may control the image sensor 322 to acquire the image data including the internal glass of the door 18.

The image sensor 322 is disposed to face the internal glass, thereby acquiring the image data. An embodiment in which the image sensor 322 disposed in the washing machine 1 or a camera module including the image sensor 322 is disposed will be described with reference to FIG. 8.

Figure 8:
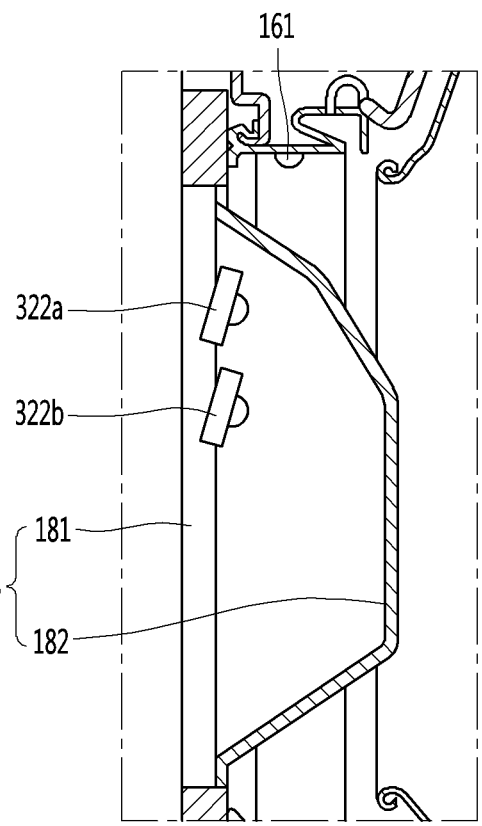
FIG. 8 is a diagram showing an example of the position of an image included in the washing machine according to the embodiment of the present invention.

FIG. 8 is a diagram showing an example of the position of an image included in the washing machine according to the embodiment of the present invention.

Referring to FIG. 8, the door 18 of the washing machine 1 may include the external cover 181 and the internal glass 182. Each of the external cover 181 and the internal glass 182 is made of a transparent material (e.g., plastic, etc.), such that the user may visually check the inside of the drum 10 through the door 18.

Meanwhile, a space may be formed between the external cover 181 and the internal glass 182, and the image sensor 322 or the camera module including the image sensor 322 may be disposed in the space. Since the image sensor 322 or the camera module is disposed in the space, it is possible to effectively prevent external impact or foreign materials of the washing machine 1 and contamination or contact by wash water or laundry in the drum 10.

For example, as shown in FIG. 8, a plurality of camera modules 322*a* and 322*b* may be disposed between the external cover 181 and the internal glass 182. A first camera module 322*a* may be implemented as a stereo camera (or a 3D camera) including a plurality of image sensors and a second camera module 322*b* may be implemented as a 2D camera including one image sensor, without being limited thereto.

Each of the plurality of camera modules 322*a* and 322*b* may be fastened to the inner wall of the external cover 181 to face the internal glass 182, thereby acquiring image data including the internal glass 182 under control of the controller 360. The controller 360 may process and combine the image data acquired by the plurality of camera modules 322*a* and 322*b* or may select any one image data to input the image data to the additional rinsing control module 100.

Meanwhile, in some embodiments, at least one light source 161 is provided on an inner circumferential surface of the laundry entrance 16*a*. The at least one light source 161 may irradiate light toward the internal glass 182 when the image data is acquired, thereby highlighting detergent bubble present on the internal glass 182 as compared to other objects. Therefore, detergent bubble may appear more clearly in the image data acquired by the camera modules 322*a* and 322*b*.

In this case, the camera modules 322*a* and 322*b* are disposed so as not to directly capture the light source 161, thereby acquiring clearer image data of the internal glass 182. As shown in FIG. 8, when the light source 161 is disposed at the upper side of the inner circumferential surface of the laundry entrance 16*a*, each of the camera modules 322*a* and 322*b* may be disposed at the upper side of the external cover 181 to be inclined downward at a predetermined angle.

FIG. 7 will be described.

The washing machine 1 may recognize presence of detergent bubble from the acquired image data through the image recognition model based on machine learning (S120). The washing machine 1 may perform control to perform the additional rinsing cycle based on the result of recognition of detergent bubble (S130).

The additional rinsing control module 100 of the washing machine 1 may recognize detergent bubble from the acquired image data to recognize presence of residual detergent and perform control to perform the additional rinsing cycle according to the result of recognition.

Steps S120 and S130 will be described in greater detail with reference to FIGS. 9 to 11.

Figure 9:
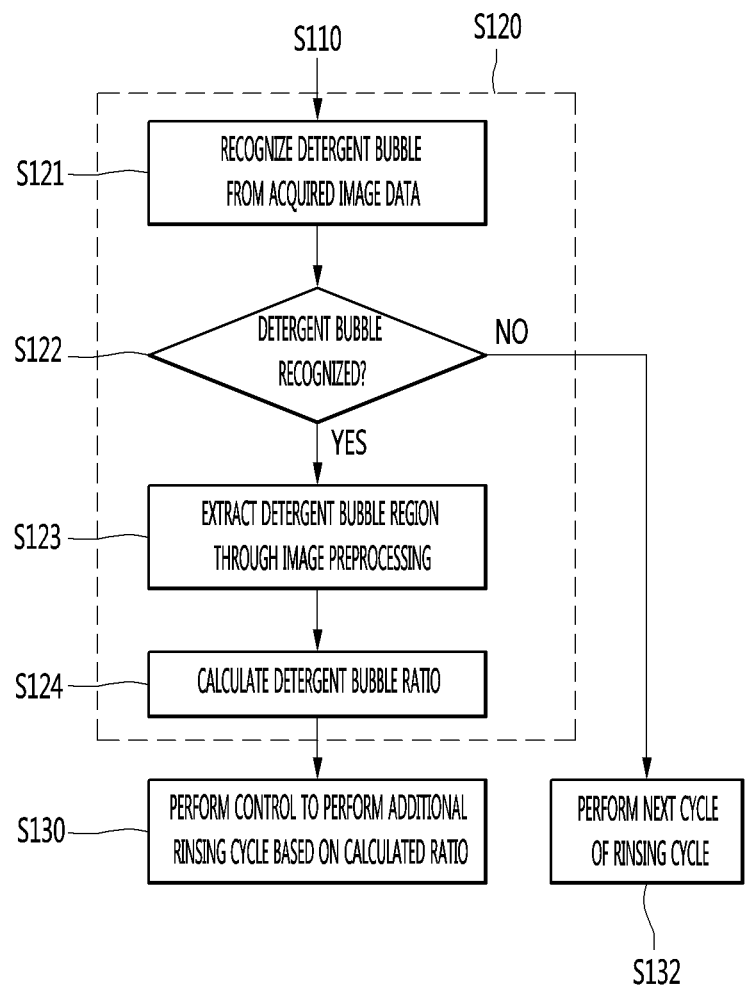
FIG. 9 is a flowchart illustrating operation of recognizing detergent bubble from image data in the washing machine according to the embodiment of the present invention in greater detail.
Figure 10:
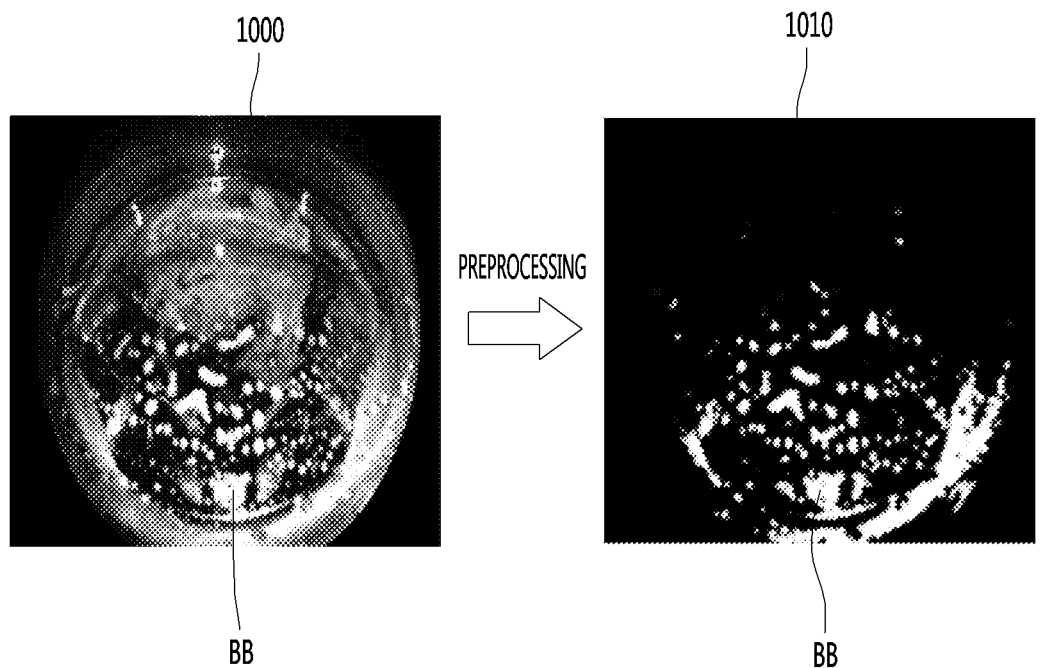
FIGS. 10 to 11 are diagrams showing examples of operation of the washing machine shown in FIG. 9.
Figure 11:
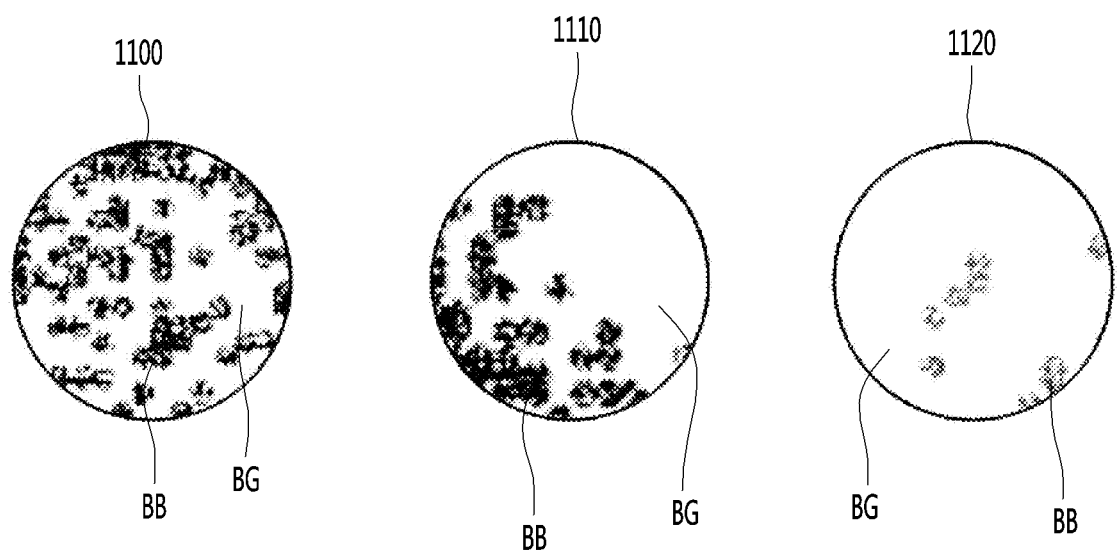

FIG. 9 is a flowchart illustrating operation of recognizing detergent bubble from image data in the washing machine according to the embodiment of the present invention in greater detail, and FIGS. 10 to 11 are diagrams showing examples of operation of the washing machine shown in FIG. 9.

Referring to FIG. 9, the washing machine 1 may recognize detergent bubble from the acquired image data (S121).

Specifically, the detergent bubble recognizer 110 included in the additional rinsing control module 100 of the washing machine 1 may recognize whether detergent bubble is included in objects included in the acquired image data using the image recognition model (artificial neural network) based on machine learning as a field of artificial intelligence.

The detergent bubble recognizer 110 may extract a plurality of feature points from the image data and input the extracted feature points to the artificial neural network to recognize whether detergent bubble is included.

When the detergent bubble recognizer 110 recognizes detergent bubble (YES of S122), the washing machine 1 may extract the detergent bubble region from the image data through image preprocessing (S123).

The image preprocessor 120 of the additional rinsing control module 100 may perform a preprocessing procedure of the image data including detergent bubble. As described above with reference to FIG. 4, the image preprocessor 120 may extract a detergent bubble region from the image data through a preprocessing scheme such as a contract adjustment and background subtraction algorithm. As the detergent bubble region is extracted, the pixel value of the detergent bubble region may be distinguished from the pixel value of the background region in the preprocessed image data.

Referring to FIG. 10, the image preprocessor 120 may preprocess the image data 1000 having the recognized detergent bubble BB. Specifically, the image preprocessor 120 may decrease the contrast of the region (background region) other than the detergent bubble BB and increase the contrast of the region corresponding to the detergent bubble BB, through contrast adjustment of the image data 1000. In addition, the image preprocessor 120 may subtract the background region (e.g., process the pixel value to correspond to black) through the background subtraction algorithm to provide preprocessed image data 1010 with highlighted detergent bubble BB.

The washing machine 1 may calculate (operate) the ratio of the detergent bubble based on the extracted detergent bubble region (S124).

The bubble ratio calculator 130 of the additional rinsing control module 100 may calculate the detergent bubble ratio in the image data preprocessed in step S123. The detergent bubble ratio may correspond to the ratio of the area of the detergent bubble to the area of the internal glass 182 or the ratio of the number of pixels of the detergent bubble region to the number of pixels of the image data.

The washing machine 1 may perform control to perform the additional rinsing cycle based on the calculated ratio (S130).

The additional rinsing setting unit 140 of the additional rinsing control module 100 or the controller 360 may set the number of times of performing the additional rinsing cycle and/or the time when the additional rinsing cycle is performed based on the detergent bubble ratio calculated by the bubble ratio calculator 130 and control the components (e.g., the water supply valve 34, the drainage pump 44, the motor 14, etc.) to perform the rinsing cycle based on the number of times of performing the additional rinsing cycle and/or the time when the additional rinsing cycle is performed.

The number of times of performing the additional rinsing cycle and/or the time when the additional rinsing cycle is performed may increase as the calculated detergent bubble ratio increases. For example, the number of times of performing the additional rinsing cycle may be set to a first number when the calculated detergent bubble ratio is a first ratio, and the number of times of performing the additional rinsing cycle may be set to the first number or a second number less than the first number when the calculated detergent bubble ratio is a second ratio less than the first ratio.

Referring to FIG. 11, the bubble ratio calculator 130 may calculate the detergent bubble ratio based on the preprocessed image data. In FIG. 11, image data 1100, 1110 and 1120 in which the detergent bubble region BB is darker than the background region BG are shown unlike FIG. 10, for convenience of description.

In FIG. 11, when the detergent bubble ratio of the first image data 1100 is a first ratio, the calculated detergent bubble ratio of the second image data 1110 is the second ratio lower than the first ratio and the calculated detergent bubble ratio of the third image data 1120 may be a third ratio lower than the second ratio. In this case, the additional rinsing setting unit 140 or the controller 360 may set the number of times of performing the additional rinsing cycle for the first ratio to a first number, set the number of times of performing the additional rinsing cycle for the second ratio to the first number or a second number less than the first number, and set the number of times of performing the additional rinsing cycle for the third ratio to the second number or a third number less than the second number.

After the additional rinsing cycle is performed, the washing machine 1 may perform steps S100 to S120 again to recognize whether residual detergent is removed.

Meanwhile, the washing machine 1 may perform additional control operation related to the rinsing cycle based on the ratio of the detergent bubble.

In some embodiments, the additional rinsing setting unit 140 or the controller 360 may set the rotation speed and/or the rotation direction of the drum 10 when the additional rinsing cycle is performed, based on the ratio of the detergent bubble.

For example, the additional rinsing setting unit 140 or the controller 360 may increase the rotation speed of the drum 10 as the ratio of the detergent bubble increases, thereby more efficiently removing the detergent present from the laundry. The controller 360 may control the motor 14 such that the drum 10 rotates at the set rotation speed when the additional rinsing cycle is performed.

For example, when the ratio of the detergent bubble is less than the set ratio, the controller 360 may control the motor 14 to rotate the drum 10 in one direction when the additional rinsing cycle is performed. In contrast, when the ratio of the detergent bubble is equal to or greater than the set ratio, the controller 360 may control the motor 14 such that the drum 10 alternately rotates in one direction by a predetermined number of times and in the other direction by a predetermined number of times when the additional rinsing cycle is performed, thereby more efficiently removing residual detergent present in the laundry or the internal glass 182.

In another embodiment, the additional rinsing setting unit 140 or the controller 360 may set a rinsing pattern or water supply attributes when the additional rinsing cycle is performed, based on the ratio of the detergent bubble. The rinsing pattern may mean a time interval between a water supply step and a drainage step of the rinsing cycle and the water supply attributes may mean the amount of supplied water or the temperature of supplied water in the water supply step.

For example, the additional rinsing setting unit 140 or the controller 360 may increase the time interval between the water supply step and the drainage step or increase the amount of supplied water or the temperature of supplied water as the ratio of the detergent bubble increases. Therefore, the washing machine 1 can more efficiently remove the residual detergent remaining in the laundry or on the internal glass 182 during the additional rinsing cycle.

In another embodiment, the additional rinsing setting unit 140 or the controller 360 may set the number of times of performing a temporary dehydration step or the time of the temporary dehydration step during the additional rinsing cycle based on the ratio of the detergent bubble. The temporary dehydration step may mean a dehydration step performed after water supplied into the drum 10 is discharged along with the detergent or contaminant during the rinsing cycle. For example, the additional rinsing setting unit 140 or the controller 360 may increase the number of times of performing the temporary dehydration step and/or the time of the temporary dehydration step as the ratio of the detergent bubble increases, thereby more efficiently discharging a mixture of water and detergent from the drum 10.

Any one of the above-described examples may be selectively performed or a plurality of examples may be simultaneously performed.

Meanwhile, when the detergent bubble recognizer 110 does not recognize detergent bubble (NO of S122), the washing machine 1 may perform the next cycle of the rinsing cycle (S132).

Here, when detergent bubble is not recognized, detergent is no longer present on the internal glass 182 or in the drum 10 or the amount of residual detergent is less than a predetermined amount.

When the detergent bubble recognizer 110 does not recognize detergent bubble, the controller 360 may control the components (e.g., the motor 14, the drainage pump 44, etc.) to perform the next cycle (e.g., the dehydration cycle) of the rinsing cycle.

That is, the washing machine 1 according to the embodiment of the present invention may calculate the ratio (or the amount) of the detergent bubble from the image data acquired from the image sensor 322 and perform the additional rinsing cycle according to the calculated ratio of detergent bubble, thereby efficiently preventing deterioration or damage of the laundry due to the detergent remaining after the rinsing cycle and preventing the skin of the user from being damaged. In addition, it is possible to solve troublesomeness that the user directly checks whether the detergent remains after the rinsing cycle is completed.

In particular, the washing machine 1 may more accurately recognize whether detergent bubble is present in the image data through the image recognition model based on machine learning as a field of artificial intelligence, thereby efficiently performing the rinsing cycle. Accordingly, it is possible to improve user satisfaction with the washing machine 1.

Hereinafter, embodiments related to learning operation of the detergent bubble recognizer 110 will be described with reference to FIGS. 12 to 14.

Figure 12:
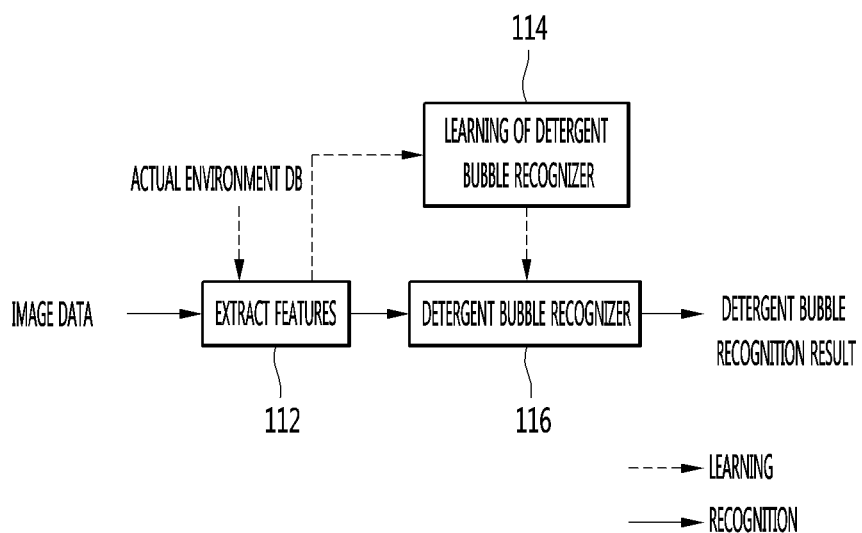
FIG. 12 is a diagram illustrating recognition operation and learning operation of the detergent bubble recognizer included in an additional rinsing control module of the washing machine according to the embodiment of the present invention.

FIG. 12 is a diagram illustrating recognition operation and learning operation of the detergent bubble recognizer included in an additional rinsing control module of the washing machine according to the embodiment of the present invention. The detergent bubble recognizer 116 of FIG. 12 may mean the artificial neural network structure included in the detergent bubble recognizer 110.

Referring to FIG. 12, as described with reference FIG. 4, when image data is input, the detergent bubble recognizer 110 may perform recognition operation of extracting feature points from the input image data (112), recognizing whether detergent bubble is present in the image data through the extracted feature points (116), and outputting a result of recognition. In some embodiments, although the detergent bubble recognizer 110 may output a one-time recognition result as a final recognition result, when recognition operation is performed by a plurality of number of times (116) and a final recognition result is output based on a plurality of recognition results, it is possible to further improve accuracy of the result of recognition of detergent bubble.

Meanwhile, the detergent bubble recognizer 110 may collect a plurality of image data acquired by the image sensor 322 to establish a database (actual environment DB) and perform learning of the detergent bubble recognizer (114) using the feature points extracted from the acquired image data and the result of recognition of the detergent bubble. Through learning of the detergent bubble recognizer, parameters (weight and bias) of the artificial neural network included in the detergent bubble recognizer 110 may be updated. The database may be stored in the memory 340 of the washing machine 1, the embedded memory of the additional rinsing control module 100, or the memory of the server.

Meanwhile, the detergent bubble recognizer 110 may perform customized learning by further using information related to the use pattern of the washing machine 1 during the learning operation.

Figure 13:
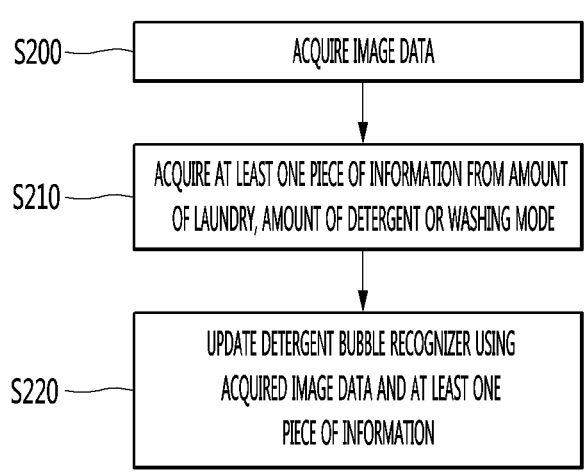
FIG. 13 is a flowchart illustrating customized learning operation of the washing machine according to the embodiment of the present invention.

FIG. 13 is a flowchart illustrating customized learning operation of the washing machine according to the embodiment of the present invention.

Referring to FIG. 13, the washing machine 1 may acquire image data through the image sensor 322 (S200). Step S200 is substantially equal to step S100 of FIG. 7 and a description thereof will be omitted.

In some embodiments, the washing machine 1 may acquire at least one of the amount of laundry, the amount of detergent or a current washing mode (S210).

As described with reference to FIG. 3, the controller 360 may detect the amount of laundry received in the drum 10 during the washing operation to acquire information on the amount of laundry or control the detergent amount detection sensor 326 to acquire information on the amount of detergent. In addition, the washing machine 1 may acquire washing mode information through the input unit 310. Information on the amount of laundry, information on the amount of detergent and washing mode information may correspond to information related to the use pattern of the washing machine 1.

The washing machine 1 may update the detergent bubble recognizer 110 using the acquired image data and at least one information acquired in step S210 (S220).

That is, the detergent bubble recognizer 110 may perform the learning process of the artificial neural network using the image data and the one or more pieces of acquired information, thereby performing customized learning of the washing machine 1.

Meanwhile, when the detergent bubble recognizer 110 is updated through customized learning, the detergent bubble recognizer 110 may input the at least one piece of information and the image data to the artificial neural network to perform recognition operation, when recognition operation of recognizing detergent bubble from the image data is performed.

That is, the washing machine 1 may perform the learning process using the information related to the use pattern, such as the amount of laundry, the amount of detergent and the washing mode and the image data acquired from the image sensor 322, thereby providing an accurate image recognition model through learning optimized for the use pattern of the washing machine 1.

Figure 14:
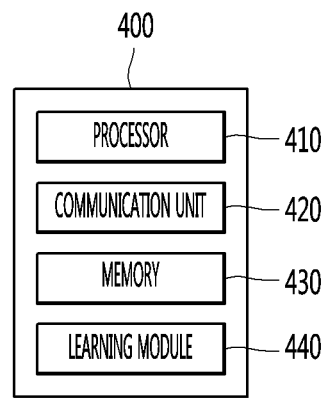
FIG. 14 is a schematic diagram of a learning server for providing learning data to the washing machine according to the embodiment of the present invention.

FIG. 14 is a schematic diagram of a learning server for providing learning data to the washing machine according to the embodiment of the present invention.

An embodiment in which the washing machine 1 updates the detergent bubble recognizer 110 through self-learning was described with reference to FIGS. 12 to 13.

However, in some embodiments, a separate server (e.g., a learning server) connected to the washing machine 1 may perform the above-described learning process.

Referring to FIG. 14, the washing machine 1 may be connected to a server 400 through the communication unit 350. The server 400 may be operated by a home appliance manufacturer of the washing machine 1 or a service provider or may be a cloud server.

The server 400 may include a processor 410, a communication unit 420, a memory 430 and a learning module 440.

The processor 410 may control overall operation of the server 400.

The communication unit 420 may receive a variety of data such as state information or operation information from the washing machine 1 or a gateway. In addition, the communication unit 420 may transmit data corresponding to the received information to the washing machine 1 or the gateway. To this end, the communication unit 420 may include at least one communication module such as an Internet module or a mobile communication module.

In particular, the communication unit 420 may receive image data including the internal glass 182 from the washing machine 1. In addition, the communication unit 420 may receive information on the number of times of performing the additional rinsing cycle and/or the time when the additional rinsing cycle is performed, which are set by the additional rinsing setting unit 140, based on the detergent bubble ratio calculated by the bubble ratio calculator 130.

The memory 430 may store information received from the washing machine 1 and include data for generating result information corresponding thereto.

In addition, the memory 430 may store various types of data used for machine learning.

The learning module 440 may perform learning operation based on the image data received from the washing machine 1 and the number of times of performing the additional rinsing cycle and/or the time when the additional rinsing cycle is performed. The learning module 440 may include the artificial neural network, e.g., the deep neural network such as the CNN, RNN or DBN described with reference to FIGS. 5 to 6 and learn the deep neural network.

As the learning method of the learning module 440, unsupervised learning and supervised learning may be used.

The processor 410 may transmit learning data for updating the artificial neural network structure included in the detergent bubble recognizer 110 of the washing machine 1 into the learned artificial neural network structure through the communication unit 420 after learning of the learning module 440.

The detergent bubble recognizer 110 of the washing machine 1 may update the artificial neural network structure based on the learning data received from the server 400.

In some embodiments, the server 400 may perform learning operation based on the image data received from the washing machine 1 of each of a plurality of users. In this case, since learning operation using a vast amount of image data is performed, it is possible to provide a more accurate image recognition model.

Meanwhile, the washing machine 1 may update the detergent bubble recognizer 110 through self-learning described with reference to FIGS. 12 to 13 and learning through the server 400 described with reference to FIG. 14.

Although not shown, the washing machine 1 may notify the user of information on an optimal rinsing cycle or the amount of detergent or perform automatic settings based on the above information, when the washing operation starts based on the learning result.

Specifically, the controller 360 may acquire information on the amount of laundry, information on the amount of detergent or washing mode information when the washing operation starts and notify the user of optimal attributes of the rinsing cycle through the output unit 330 based on the acquired information and the learned data or automatically set the rinsing cycle using the optimal attributes. The attributes of the rinsing cycle may include various attributes set with respect to the rinsing cycle, such as the number of times of performing the rinsing cycle, the time of the rinsing cycle, the rotation speed or direction of the drum 10, the amount of supplied water, the temperature of supplied water, an interval between the water supply step and the drainage step, the number of times of performing the temporary dehydration step or the time of the temporary dehydration step.

In addition, the controller 360 may notify the user of information on an optimal amount of detergent through the output unit 330 based on the information on the amount of laundry and/or the washing mode information. In some embodiments, when the detergent supply part 60 has an automatic detergent putting function, the controller 360 may control the detergent supply part 60 such that the detergent is put into the drum 10 based on the information on the optimal amount of detergent.

According to the embodiment of the present invention, the washing machine may accurately recognize whether detergent bubble is present in the acquired image data after the rinsing cycle is completed, through the image recognition model based on machine learning as a field of artificial intelligence, thereby efficiently performing the rinsing cycle. Accordingly, it is possible to improve user satisfaction with the washing machine.

The washing machine perform the additional rinsing cycle according to the ratio of the detergent bubble from the image data acquired from the image sensor, thereby efficiently preventing deterioration or damage of laundry due to detergent remaining after the rinsing cycle and preventing the skin of the user from being damaged. In addition, it is possible to solve user troublesomeness that the user directly checks whether the detergent remains after the rinsing cycle is completed.

In addition, the washing machine may perform the learning process of the image recognition model using the amount of laundry, the amount of detergent and the washing mode and the acquired image data, thereby providing an accurate image recognition model through learning optimized for the use pattern of the washing machine.

The foregoing description is merely illustrative of the technical idea of the present invention, and various changes and modifications may be made by those skilled in the art without departing from the essential characteristics of the present invention.

Therefore, the embodiments disclosed in the present invention are to be construed as illustrative and not restrictive, and the scope of the technical idea of the present invention is not limited by these embodiments.

The scope of the present invention should be construed according to the following claims, and all technical ideas within equivalency range of the appended claims should be construed as being included in the scope of the present invention.

What is claimed is:

1. A washing machine comprising:
   a door comprising an external cover and an internal glass configured to open and close a laundry entrance of the washing machine;
   at least one image sensor disposed to face the internal glass and configured to acquire image data;
   a detergent bubble recognizer configured to recognize detergent bubbles from the image data through a machine learning based image recognition model;

a controller configured to control the washing machine to perform an additional rinsing cycle based on a result of recognition, and a bubble ratio calculator configured to process the image data and to calculate a ratio of an area of the detergent bubbles to an area of the internal glass, based on the detergent bubbles being recognized by the detergent bubble recognizer, wherein the controller is configured to control the washing machine to perform the additional rinsing cycle based on the ratio calculated by the bubble ratio calculator.

2. The washing machine of claim 1, wherein the controller is further configured to update the machine learning based image recognition model of the detergent bubble recognizer using the acquired image data, and at least one of (i) information regarding an amount of laundry, (ii) information regarding an amount of detergent, or (iii) washing mode information.

3. The washing machine of claim 1, wherein the controller is further configured to set a number of times for performing the additional rinsing cycle based on the ratio calculated by the bubble ratio calculator.

4. The washing machine of claim 3, wherein the controller is further configured to:

set the number of times for performing the additional rinsing cycle to a first number based on the calculated ratio being a first ratio, and set the number of times for performing the additional rinsing cycle to a second number based on the calculated ratio being a second ratio greater than the first ratio.

5. The washing machine of claim 1, wherein the controller is further configured to increase a duration of time for performing the additional rinsing cycle, as the calculated ratio increases.

6. The washing machine of claim 1, wherein the controller is further configured to control the at least one image sensor to acquire the image data based on completion of a first rinsing cycle prior to the additional rinsing cycle.

7. The washing machine of claim 6, wherein the first rinsing cycle is one of a plurality of cycles in a washing operation of the washing machine, and wherein the controller is further configured to perform a next cycle that follows the first rinsing cycle in the washing operation, based on the detergent bubbles not being recognized from the image data by the detergent bubble recognizer.

8. The washing machine of claim 1, wherein the at least one image sensor is disposed between the external cover and the internal glass of the door.

9. The washing machine of claim 8, wherein the at least one image sensor is fastened to an internal wall of the external cover of the door.

10. The washing machine of claim 1, further comprising at least one light source provided on an inner circumferential surface of the laundry entrance, wherein the controller is configured to activate the at least one light source during acquisition of the image data by the at least one image sensor.

11. The washing machine of claim 1, wherein the image recognition model comprises a deep neural network that is configured to implement machine-based deep learning.

12. The washing machine of claim 1, further comprising a communication unit configured to transmit, to a server or a terminal, the acquired image data or at least one of (i) a number of times for performing the additional rinsing cycle, or (ii) duration of time for performing the additional rinsing cycle based on the ratio calculated by the bubble ratio calculator.

13. The washing machine of claim 12, wherein the controller is further configured to:

receive updated learning data from the server through the communication unit; and update the machine learning based image recognition model of the detergent bubble recognizer based on the received updated learning data.

* * * * *